United States Patent Office 2,714,295
Patented Aug. 2, 1955

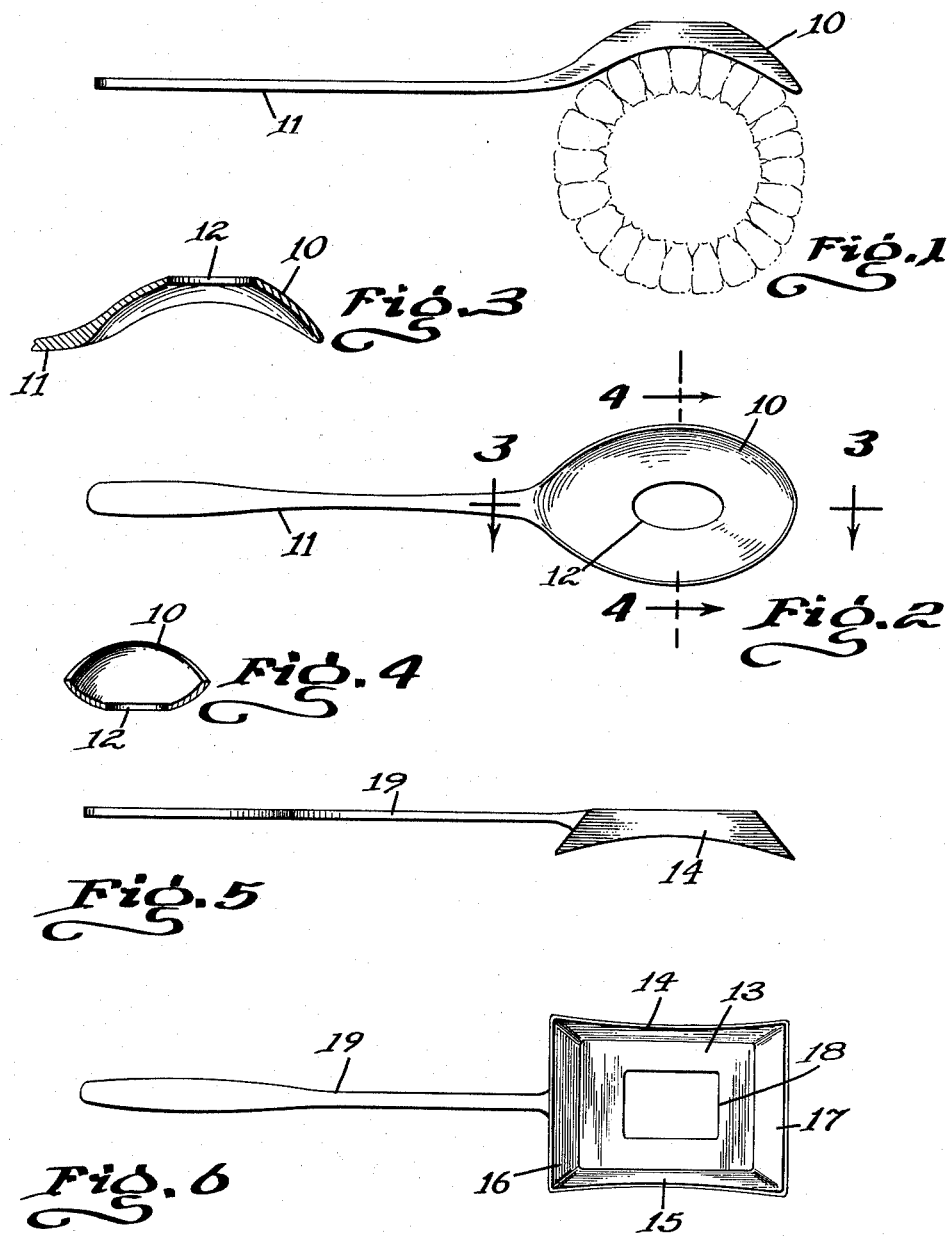

2,714,295

EAR OF CORN BUTTER APPLICATOR

Joseph S. Schick, Terre Haute, Ind.

Application May 13, 1954, Serial No. 429,494

1 Claim. (Cl. 65—12)

This invention relates to kitchen and dining table implements and utensils, and in particular a device for retaining a supply of butter whereby the butter may readily be spread over the surface of an ear of corn.

The purpose of this invention is to facilitate applying butter to hot ears of corn to obviate the necessity of endeavoring to spread butter over the corn particularly where it is desirable to spread butter over portions of the ear of corn as the corn is taken from the cob.

It is difficult to spread butter over a hot arcuate surface, such as that of an ear of corn with a flat implement, such as a knife, particularly as the butter leaves the knife and drops from the ear of corn. With this thought in mind, this invention contemplates a holder having a handle with the holder adapted to retain a pat of butter or the like and with the holder having an opening in the base whereby butter in engagement with the surface of an ear of corn is adapted to flow freely from the holder.

The object of this invention is, therefore, to provide means for holding a mass or pat of butter with the holder in an inverted position whereby the butter may readily be applied to the surface of an ear of corn.

Another object of the invention is to provide an applicator for applying butter to the surface of an ear of corn in which a butter retaining portion of the applicator is adapted to be filled by cutting butter from a block, such as with a knife.

A further object of the invention is to provide an applicator for applying butter to an ear of corn in which the device may readily be cleaned.

A still further object of the invention is to provide a device for applying butter to ears of corn in which the device is of a simple and economical construction.

With these and other objects and advantages in view, the invention embodies a butter holder patterned after a spoon with the base or bowl of the spoon having an opening therethrough, providing a holder for butter and with a handle extended from the holder.

Other features and advantages of the invention will appear from the following description taken in connection with the drawing, wherein:

Figure 1 is a side elevational view of the butter applicator showing the device as it appears in use for spreading butter on an ear of corn, the ear of corn being shown in dotted lines, and the device being shown with the spoon or butter holding portion of the device in an inverted position.

Figure 2 is a view looking upwardly toward the under surface of the butter applicator.

Figure 3 is a longitudinal section through the device taken on line 3—3 of Fig. 2 showing the device with the handle portion broken away.

Figure 4 is a cross section through the butter holding portion of the device taken on line 4—4 of Fig. 2.

Figure 5 is a side elevational view of the butter applicator illustrating a modification wherein a device is provided for holding rectangular shaped pats of butter.

Figure 6 is a view looking upwardly toward the under surface of the device shown in Fig. 5.

Referring now to the drawing wherein like reference characters denote corresponding parts, the improved butter applicator of this invention includes a bowl 10 providing a butter holder and a handle 11 extended from one end of the bowl whereby with a mass or pat of butter positioned in the bowl the device is held by the handle with the bowl in an inverted position whereby the butter in the bowl is adapted to be applied to the outer surfaces of kernels of corn on an ear of corn, as illustrated in Fig. 1.

The base or intermediate portion of the bowl is provided with an opening 12 to relieve a vacuum that may be formed behind the pat of butter whereby the butter will flow freely to the kernels of corn.

In the design shown in Figs. 1, 2, 3 and 4 the bowl is patterned to represent the bowl of a spoon, and it will be understood that the butter holder or applicator may be of any suitable shape or design. The holder shown particularly in Fig. 2 is oval shaped and an oval shaped opening, such as indicated by the numeral 12, is provided in the center.

In the design shown in Figs. 5 and 6 the butter applicator is rectangularly shaped wherein a base 13 having inclined side walls 14 and 15 and inclined end walls 16 and 17, is provided, and the base is provided with an opening 18 thereby providing a holder for a conventional square or pat of butter or the like with the opening 18 providing means for relieving vacuum behind the mass of butter. This device is also provided with a handle, such as a handle 19, the handle being similar to the handle 11.

It will be understood that the device may be made of plastic, silver, or other suitable materials, and it will also be understood that the device may be provided in different designs.

With the parts formed as shown and described, a square or mass of butter may readily be impressed into the bowl or holding portion of the device or the device may slice through a bar or square of butter, similar to the action of a knife, wherein butter removed from the square will be positioned in the bowl and may be nested in the inner portion of the bowl or holder.

It will be noted in Figs. 1 and 5 that the sides or edges of the bowl or butter holding portion of the device are formed on a radius substantially corresponding with the radius of an ear of corn whereby the applicator nests over an ear of corn as illustrated in Fig. 1.

The improved butter applicator or "cobber" of this invention, therefore, provides means for packing an inverted tray or holder with butter or the like and the opening in the base makes it possible to retain the butter or the like in the cobber until substantially all of the butter is used.

It will be understood that other modifications, within the scope of the appended claim, may be made in the design and arrangement of the parts without departing from the spirit of the invention.

What is claimed is:

In a butter applicator, the combination which comprises a butter holding element having a base of rectangular shape in plan, upwardly and outwardly inclined side and end walls integral with the edges of said base with the upper edges of said side walls being of concave formation to conform in contour with a portion of the surface of an ear of corn, said base having an opening in the center thereof the edges of the opening conforming in contour to the edges of the base and equally spaced from the edges of the base and a handle extended from one end wall of said element.

(References on following page)

References Cited in the file of this patent

UNITED STATES PATENTS

| | | |
|---|---|---|
| D. 157,183 | Newell | Feb. 7, 1950 |
| D. 159,748 | Mossel | Aug. 15, 1950 |
| 47,106 | Herr | Apr. 4, 1865 |
| 72,136 | Webster | Dec. 10, 1867 |
| 303,022 | Kilborn | Aug. 5, 1884 |
| 644,732 | Crandall | Mar. 6, 1900 |
| 827,101 | Hutchins | July 31, 1906 |
| 1,097,465 | Pratt | May 19, 1914 |
| 1,260,822 | Singleton | Mar. 26, 1918 |
| 1,350,098 | Hessey | Aug. 17, 1920 |
| 1,893,889 | Guerini | Jan. 10, 1933 |
| 2,092,878 | Hess | Sept. 14, 1937 |
| 2,556,092 | Kimball | June 5, 1951 |
| 2,581,745 | Amorino et al. | Jan. 8, 1952 |

FOREIGN PATENTS

| | | |
|---|---|---|
| 518,035 | Great Britain | Feb. 15, 1940 |